United States Patent [19]

Chua et al.

[11] 4,360,572
[45] Nov. 23, 1982

[54] ELECTROCHEMICAL CELL

[75] Inventors: David L. Chua, Bridgeport; Kurt F. Garoutte, Furlong; Louis L. Levy, Plymouth Meeting, all of Pa.

[73] Assignee: Honeywell, Inc., Minneapolis, Minn.

[21] Appl. No.: 235,463

[22] Filed: Feb. 18, 1981

[51] Int. Cl.$^3$ .......................................... H01M 10/52
[52] U.S. Cl. ................................. 429/53; 429/101; 29/623.1
[58] Field of Search ................ 429/48, 53, 54, 56, 429/101, 196, 57; 29/623.1

[56] References Cited

U.S. PATENT DOCUMENTS

| 4,115,629 | 9/1978 | Dey | 429/56 |
| 4,218,523 | 8/1980 | Kalnoki-Kis | 429/101 |
| 4,293,784 | 6/1978 | Driscoll | 429/196 |
| 4,296,185 | 10/1981 | Catanzarite | 429/101 |

Primary Examiner—Donald L. Walton
Attorney, Agent, or Firm—Charles G. Mersereau

[57] ABSTRACT

An electrochemical cell having a lithium anode, a thionyl chloride depolarizer and a sulphur dioxide passivation control agent which further includes having the pressure relieved to substantially reduce the internal pressure of the cell. The internal cell pressure is relieved by venting for sufficient time at an elevated temperature to reduce the internal cell pressure to less than five psi at room temperature, preferably by a plurality of venting cycles and a temperature ranging from room temperature to the elevated temperature. Normally, the elevated temperature ranges from at least 100° F. to greater than 150° F.

14 Claims, No Drawings

ELECTROCHEMICAL CELL

BACKGROUND OF THE INVENTION

Substantial development effort has been expended on thionyl chloride/lithium batteries because of the extremely high energy contained in this electrochemical couple. One advantage of the cell is that thionyl chloride is a liquid and does not cause substantial pressure in the cell. However, thionyl chloride has been found to have substantial difficulty as a depolarizer in cells which are stored for any length of time, particularly at high temperature because of lithium negative electrode passivation. The use of sulphur dioxide as a passivation control agent has been found to prevent this disability at high temperature after long storage times and such a system is disclosed in U.S. Patent application Ser. No. 731,064, filed Oct. 8, 1976 now U.S. Pat. No. 4,309,490 issued Jan. 5, 1982 and assigned to the same assignee as the present invention. That system, however, because of the gaseous nature of sulphur dioxide, requires a substantially stronger cell to deal with the internal pressure, particulary after the cell has been discharged. Typical cells have up to fifty-five or more psig internal pressure upon completion of discharge at room temperature. At elevated temperatures, of course the pressure is substantially greater.

SUMMARY OF THE INVENTION

It has now been discovered that a safe active low pressure lithium thionyl chloride battery, which is able to take the advantage of the sulphur dioxide passivation control feature to permit rapid activation after long or high temperature storage, can be manufactured. The cell of the present invention includes the concept of venting the cell at elevated temperature, preferably, to relieve the pressure in the cell after the sulphur dioxide has had the opportunity to assist in controlling the passivating film growth at the anode, which happens almost instantaneously. In the preferred embodiment, the cell is vented for sufficient times to reduce the internal cell pressure to less than five psig at room temperature. The elevated temperature at which the cell is vented should be at least 100° F., and preferably at least 160° F. The venting can be accomplished in a single bleeding of the pressure from the cell or it may be accomplished by a plurality of venting cycles at temperatures ranging from room temperature to the elevated temperature previously mentioned. When practiced, the plurality of venting cycles is oftentimes sufficient to lower the internal cell pressure to less than one atmosphere at room temperature.

DETAILED DESCRIPTION OF THE INVENTION

As has been mentioned above, the invention comprises the venting of the pressure caused by the addition of sulphur dioxide to lithium thionyl chloride battery. It has been discovered that the efficiencies and improvements found by the addition of sulphur dioxide in permitting operation of cells which have been stored at a high temperature or for a long period of time or both can be achieved by the addition of sulphur dioxide and are not materially affected or taken away by venting the gases after the cell is assembled with the sulphur dioxide present.

Nine cells were constructed to obtain basic data relative to the effect of bleeding at various temperatures prior to discharge of the cell. All nine cells were eventually discharged at room temperature. However, bleeding or venting of the cell was accomplished at both 110° F. and 165° F. in the manner set forth below. Three cells were bled at 165° F. and three more were bled at 110° F. The remaining three cells served as controls and were not bled. One control cell was discharged immediately at 75° F. A second control cell was stored unbled at 110° F. and the third control cell was stored unbled at 165° F. The storage of all cells was four weeks.

Three cells were then evaluated by venting the pressure in the cells at a temperature of 110° F. for approximately fifteen minutes, that is until the cell pressure could no longer be reduced by leaving the fill valve slightly cracked. The cells were then stored at 110° F. for a week and the process was repeated three additional times for a total of four cycles. During the period of time when the fill valve was closed, slight pressure increases were observed with the passage of time.

Another set of three cells were tested by storing at 165° with bleeding cycles of approximately fifteen minutes every week for a period of four weeks.

All of the cells were then reduced to room temperature for discharged testing. The internal pressure of all of the 165° F. bled cells were negative, that is it was less than one atmosphere. Two of the three cells bled at 110° F. had negative cell pressure or less than one atmosphere while the final or third 110° bled cell has an internal pressure of approximately 2 psig at room temperature. The cells were then discharged under load until the substantial voltage drop occurred indicating a depletion of the cell. The capacity of the cell was measured in terms of ampere hours of current. In the unbled controls, the internal pressure of the discharged cells was between forty-five to fifty-five psig at room temperature. The 110° F. bled cells had a pressure of twenty to twenty-five psig and the 165° F. bled cells were in a range of five to ten psig. Substantial reduction in the pressure permitted the design of much safer cells.

Presented below in Table I are the results of the tests previously described. As can be seen, the discharge pressure is substantially reduced using the process of this invention, thereby enabling more efficient construction of cells. All of the tests indicated that the passivation activity of the sulphur dioxide was accomplished equally in all of the cells whether or not a bleeding cycle or a venting cycle was employed.

TABLE I

| CELL NO. | TEMPERATURE STORAGE | TEMPERATURE BLEEDG | STARTING PRESSURE AT ROOM TEMP. | END OF LIFE PRESSURE AT ROOM TEMP. |
|---|---|---|---|---|
| 1 | 75° F. | — | 20 psig | 40 psig |
| 2 | 110° F. | — | 50 psig | 50 psig |
| 3 | 165° F. | — | 30 psig | 50 psig |
| 4 | — | 110 | −2 psig | 25 psig |
| 5 | — | 110 | −2 psig | 22 psig |
| 6 | — | 110 | +2 psig | 22 psig |
| 7 | — | 165 | −5 psig | 10 psig |

TABLE I-continued

| CELL NO. | TEMPERATURE STORAGE - | TEMPERATURE BLEEDG | STARTING PRESSURE AT ROOM TEMP. | END OF LIFE PRESSURE AT ROOM TEMP. |
|---|---|---|---|---|
| 8 | — | 165 | −5 psig | 7 psig |
| 9 | — | 165 | −10 psig | 10 psig |

Presented below in Table II are the results of the discharge of the cells previously described herein. As can be seen, the ampere hour capacity is roughly equivalent for all of the cells, indicating that the bleeding had no adverse effect on performance while substantially reducing the pressure of the cell upon discharge.

TABLE II

| CELL NO. | TEMPERATURE STORAGE / | TEMPERATURE BLEEDG | CAPACITY A HR. |
|---|---|---|---|
| 1 | 75 | — | 11,372 |
| 2 | 110 | — | 12,160 |
| 3 | 165 | — | 11,700 |
| 4 | — | 110 | 12,840 |
| 5 | — | 110 | 11,740 |
| 6 | — | 110 | 13,160 |
| 7 | — | 165 | 11,240 |
| 8 | — | 165 | 10,560 |
| 9 | — | 165 | 10,800 |

Having thus described the invention, what is claimed is:

1. An electrochemical cell having lithium anode, a thionyl chloride depolarizer and a sulphur dioxide passivation control agent and wherein said cell has been pressure relieved to substantially reduce the internal cell pressure.

2. The cell of claim 1 wherein said cell pressure is relieved by venting at an elevated temperature.

3. The cell of claim 2 wherein said cell is vented for sufficient time to reduce the internal cell pressure to less than five psig at room temperature.

4. The cell of claim 3 wherein said temperature of venting is at least 100° F.

5. The cell of claim 4 wherein said temperature is at least 160° F.

6. The cell of claim 3 wherein said venting includes a plurality of venting cycles at temperatures ranging from room temperature to said elevated temperature.

7. The cell of claim 6 wherein said plurality of cycles is sufficient to lower the internal cell pressure to less than one atmosphere at room temperature.

8. In a method of manufacturing an electrochemical cell having a lithium anode, a thionyl chloride depolizer and a sulphur dioxide passivation control agent, the improvement comprising the step of relieving the internal pressure of said cell.

9. The method of claim 8 wherein said cell pressure is relieved by venting at an elevated temperature.

10. The method of claim 9 wherein said cell is vented for sufficient time to reduce the internal cell pressure to less than five psig at room temperature.

11. The method of claim 10 wherein said temperature is at least 100° F.

12. The method of claim 11 wherein said temperature is at least 160° F.

13. The method of claim 10 wherein said venting includes a plurality of venting cycles at temperature ranging from room temperature to said elevated temperature.

14. The method of claim 13 wherein said plurality of cycles is sufficient to lower the internal cell pressure to less than one atmosphere at room temperature.

* * * * *